June 7, 1949.　　　L. F. WHITNEY　　　2,472,451
PRESSURE COOKER
Filed April 12, 1945　　　　　　　　7 Sheets-Sheet 1
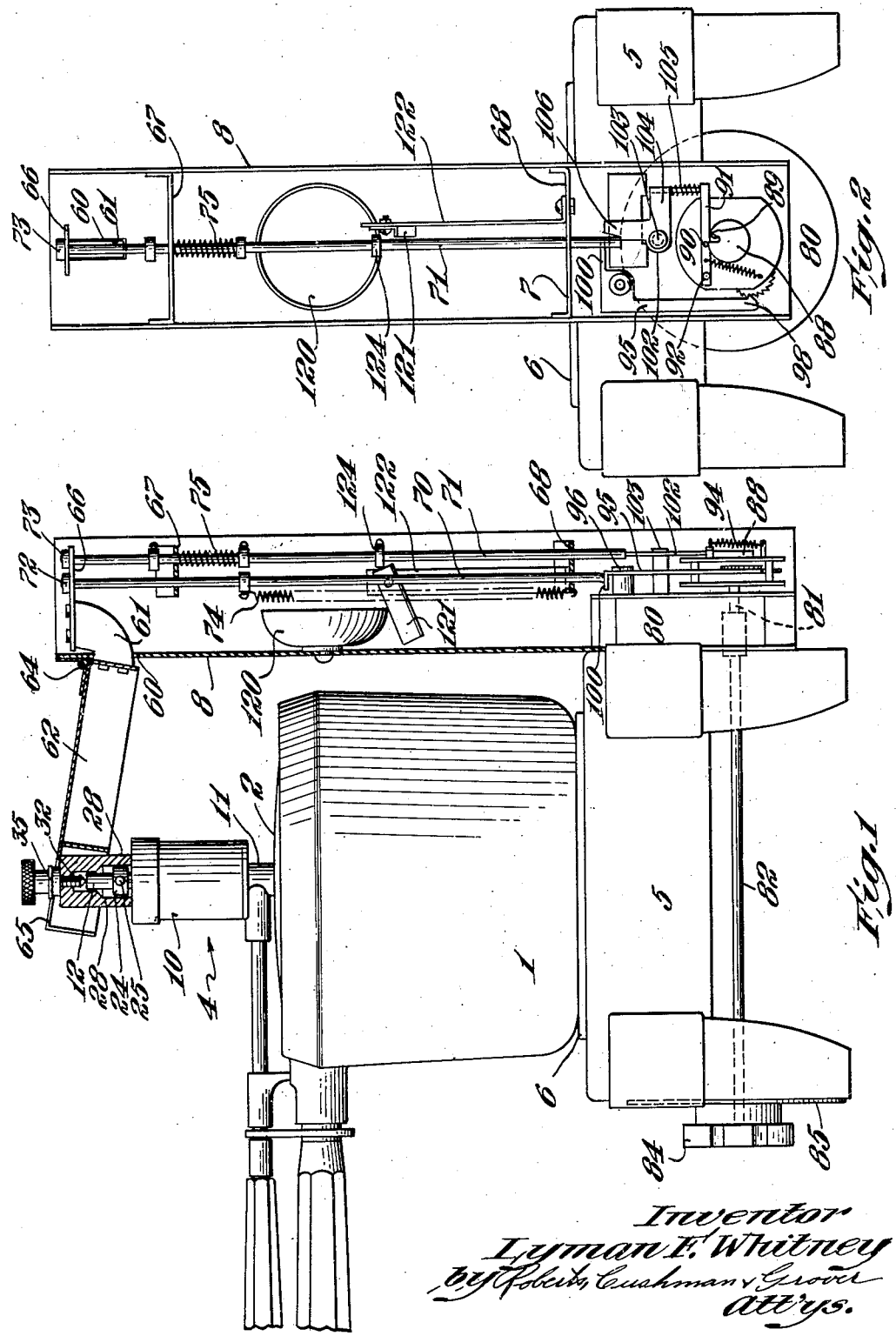
Inventor
Lyman F. Whitney
by Roberts, Cushman & Grover
Attys.

June 7, 1949. L. F. WHITNEY 2,472,451
PRESSURE COOKER
Filed April 12, 1945 7 Sheets-Sheet 2
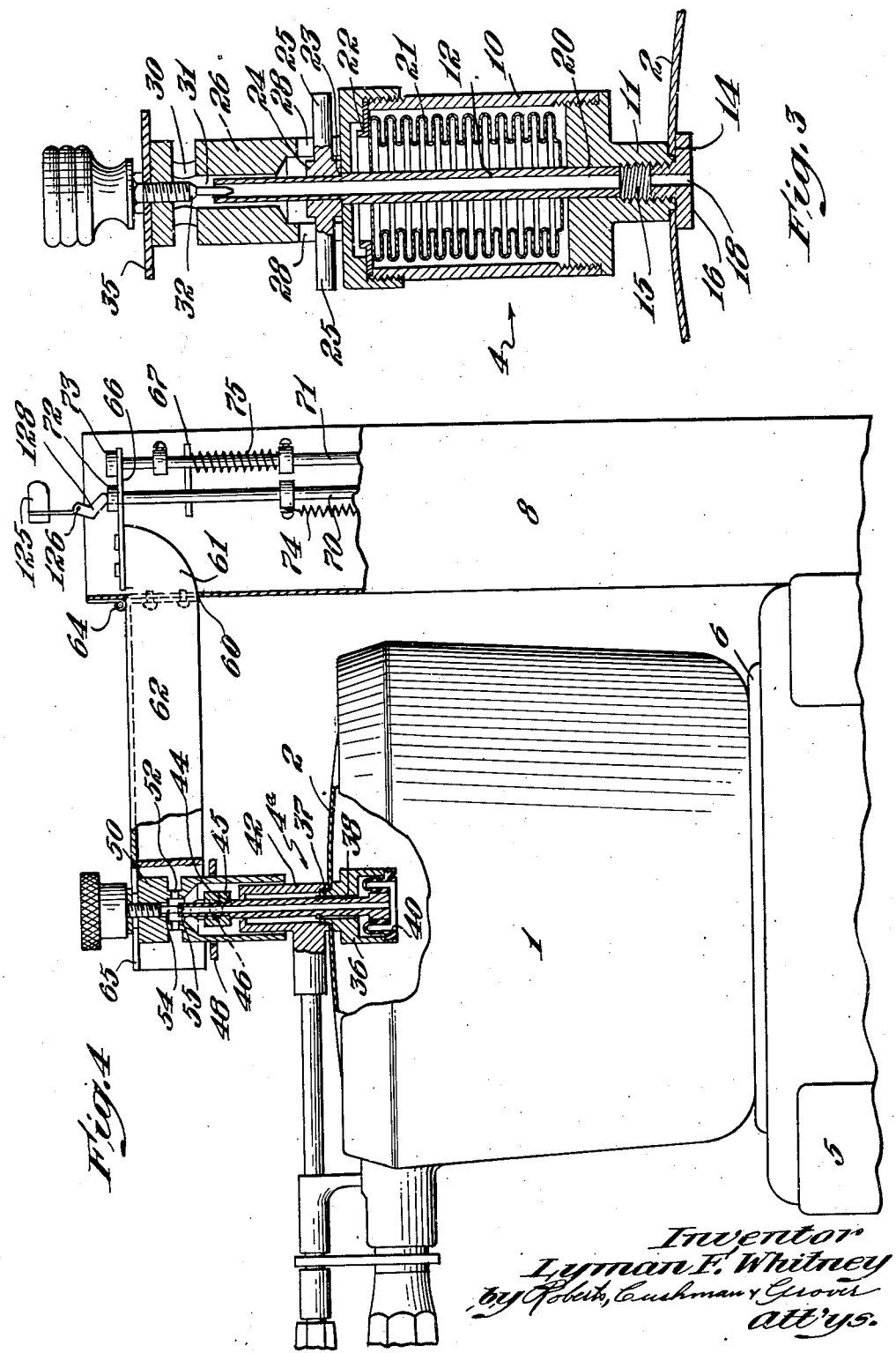
Inventor
Lyman F. Whitney
by Roberts, Cushman & Grover
att'ys.

June 7, 1949. L. F. WHITNEY 2,472,451
PRESSURE COOKER
Filed April 12, 1945 7 Sheets-Sheet 4
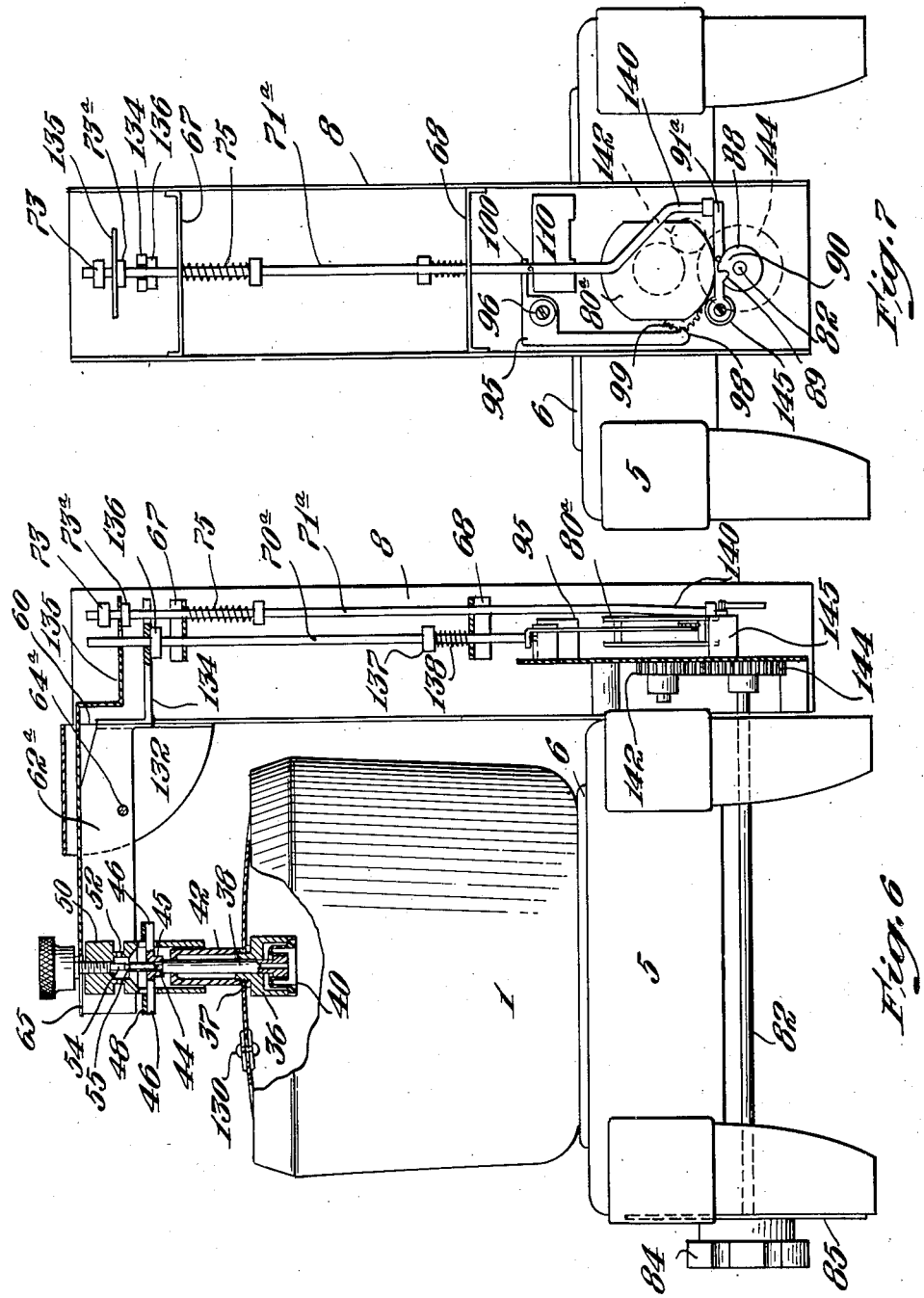
Inventor
Lyman F. Whitney
by Roberts, Cushman & Grover
Att'ys.

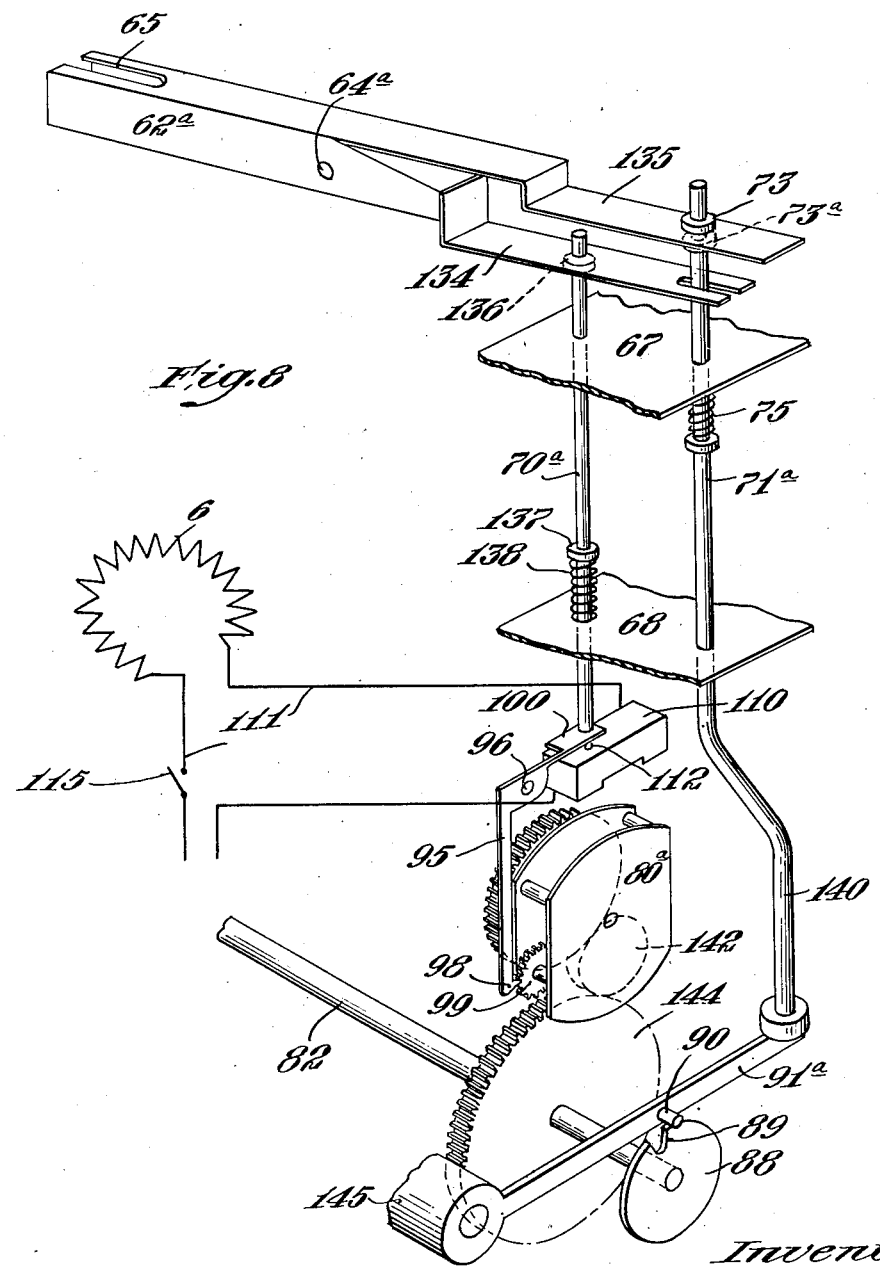

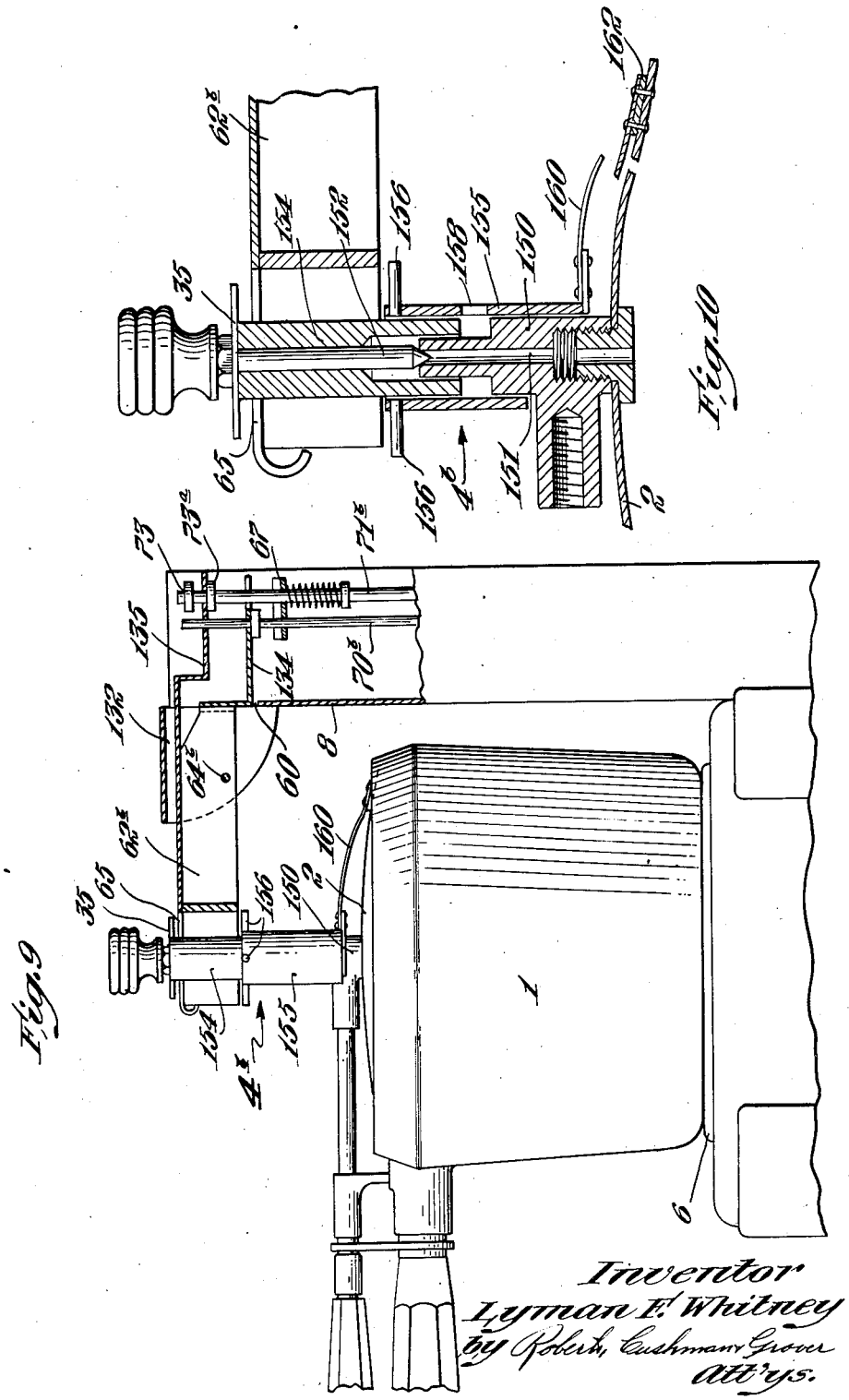

Inventor
Lyman F. Whitney
by Roberts, Cushman & Groot
att'ys.

Patented June 7, 1949

2,472,451

UNITED STATES PATENT OFFICE 2,472,451

PRESSURE COOKER

Lyman F. Whitney, Cambridge, Mass., assignor, by mesne assignments, to Stator Corporation, Providence, R. I., a corporation of Rhode Island Application April 12, 1945, Serial No. 587,933

34 Claims. (Cl. 219—43)

This invention relates to pressure apparatus such as pressure cookers and the like requiring the use of steam or other gas under pressure for a predetermined period of time.

In using processing apparatus of the aforesaid type, particularly for domestic cooking, it is usually necessary for the operator to maintain constant surveillance from the time heat is applied until the time the operation is completed. For example, with the conventional pressure cooker it is necessary first to heat the water to boiling with the vent or cover at least partially open so as to expel air, then close the vent or cover so as to build up the required pressure, check the amount of heat applied to the estimated minimum requirement to maintain the pressure, time the cooking period from the moment that the gauge indicates the correct cooking pressure, periodically adjust the heat so as to hold the cooking pressure within the normal range, promptly shut off the heat at the end of the cooking period, and carefully vent or otherwise reduce the pressure as soon as possible. Failure to exercise the foregoing manipulations may result in improper cooking and possible injury to the apparatus and anyone present in the immediate vicinity.

The principal objects of the present invention are to provide an efficient and reliable apparatus of the above type for automatically performing all of the aforementioned manipulations, thereby dispensing with the necessity of maintaining constant surveillance during the cooking or processing operation, and to provide an apparatus which is of compact form and so designed that a predetermined pressure may be accurately maintained for any desired time and which may, if desired, include means for signaling the operator at the end of the cooking or processing period.

Further objects relate to various features of construction and will be apparent from a consideration of the following description.

In accordance with the present invention a pressure vessel is provided with an opening or discharge duct with which is associated a control head including diaphragm, bellows, a bimetallic element or other means responsive to heat and/or pressure, and also if desired, a relief valve by means of which the pressure vessel may be vented.

The heat or pressure-responsive member is associated with a control mechanism which is operatively associated with a timing mechanism and a control device for a heater arranged to supply heat to the pressure vessel so that the amount of heat supplied to the pressure vessel and the duration may be automatically controlled. The timing mechanism may comprise an electric or a spring-operated clock having the usual dials or setting means by which the mechanism may be set to operate for any specified period, and the heat control means may be an electric switch or rheostat for an electric stove, or a valve for a steam coil or jacket, or a valve for a gas or an oil burner. In any case the design of the parts is such that when the pressure and/or temperature within the vessel is below a predetermined normal, the control mechanism, acting in response to the heat or pressure-responsive member, operates the heat control means to apply heat to the vessel, and when predetermined starting thermal conditions prevail within the vessel, the timing mechanism is brought into operation, and when the pressure or temperature within the vessel rises beyond a predetermined normal, the control mechanism operates to shut off or reduce the heat applied to the vessel until the pressure or temperature drops to the predetermined normal, but without interfering with the operation of the timing mechanism.

The control mechanism may also include means associated with the vent valve and timing mechanism so that upon the expiration of the period for which the timing mechanism is set, the control mechanism operates not only to shut off the heat, but also to open the valve of the control head, thereby venting the pressure vessel. If desired, visual and/or audible signals may be associated with the control mechanism so as to indicate the completion of the cooking or processing operation.

In the accompanying drawings which show different embodiments of the invention designed for domestic use—

Fig. 1 is a side elevation of the pressure apparatus, with certain parts broken away, and provided with one type of control head;

Fig. 2 is a rear elevation of the apparatus shown in Fig. 1, except that the parts are in starting position;

Fig. 3 is a longitudinal section through the type of control head shown in Fig. 1;

Fig. 4 is a side elevation with parts broken away and shown in section of a pressure apparatus embodying a control head of modified construction and also including a visual signal;

Fig. 6 is a view similar to Fig. 4 but showing an apparatus having a control mechanism of modified construction;

Fig. 7 is a rear view of the apparatus shown in Fig. 6;

Fig. 8 is a diagrammatic view of the main operating mechanism of the apparatus shown in Figs. 6 and 7;

Fig. 9 is a view similar to Fig. 4, but illustrating a further modification embodying a heat responsive element;

Fig. 10 is an enlarged longitudinal section through the control head and associated parts shown in Fig. 9.

Figure 5:
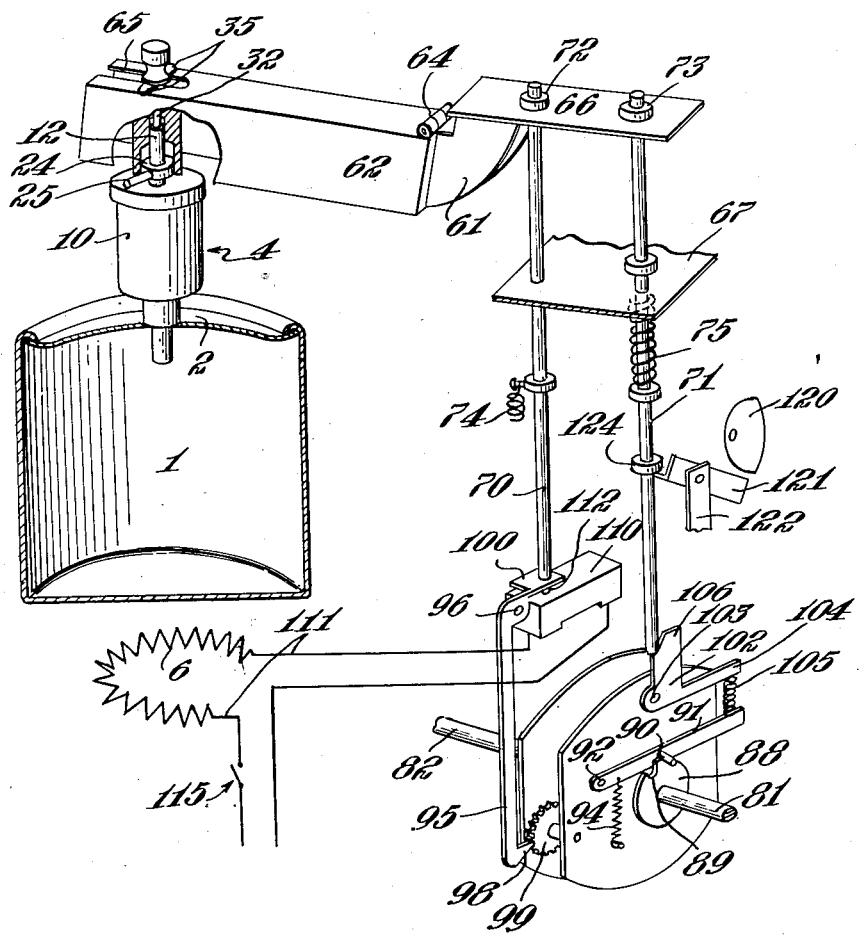
Fig. 5 is a diagrammatic view of the main operating parts of the apparatus shown in Figs. 1 to 4.

Referring to the embodiments shown in Figs. 1 to 5, the numeral 1 designates a pressure vessel having a cover 2 provided with a central opening or vent duct which receives a control head 4. The pressure vessel is seated on an electric stove 5 having the usual heating coils or elements 6 and attached to the rear of the stove is an upstanding housing 8 within which certain parts of the control mechanism are disposed.

The control head 4 may embody a pressure-responsive element of the bellows type, as shown in Fig. 3, comprising a cylindrical casing 10 formed with a central depending boss 11 and axial openings at each end through which project a movable vent pipe 12. The lower end of the boss 11 is shouldered, as indicated at 14, to fit the opening in the cover and its axial opening 15 is threaded t receive a headed screw 16 which firmly clamps the control head to the cover 2, the screw 16 having an opening 18 providing a communication between the interior of the pressure vessel 1 and the opening 15. The upper end of the opening 15 is provided with a bleeder passage or groove 20 to admit gaseous pressure from the pressure vessel 1 to the casing 10. The vent pipe 12 is slidable in the axial opening of the case and its lower end portion is welded or otherwise integrally secured to the lower end of a bellows 21, the upper end of which is provided with an annular flange 22 clamped between the end and side walls of the casing. The upper portion of the vent pipe 12 is shouldered, as indicated at 23, and carries a collar 24 having radial arms 25, the construction and arrangement of parts being such that pressure admitted through passage 20 into the interior of the casing 10 compresses the bellows 21 to cause the vent pipe 12 to rise or move upwardly, thereby elevating the arms 25 a vertical distance corresponding to the prevailing pressure within the pressure vessel 1 and casing 10.

A cap 26 having a bifurcated lower end defining legs 28 is disposed on the top wall of the casing 10 with its legs straddling the arms 25. The upper end of the cap is formed with a groove communicating through radial openings 30 with the central bore or chamber 31 into which the upper end of the vent pipe projects. A depending stem 32 projects into the upper end of the vent pipe 12 to provide a vent valve which is open, as shown in Fig. 3, when atmospheric temperature and pressure conditions prevail within the vessel 1, but which closes when the vent pipe 12 is elevated in response to an increase in pressure within the casing 10. A pair of oppositely disposed radial arms 35 are suitably secured to the upper end of the cap 26 and provide a means by which the cap may be lifted so as to open the vent valve 32, irrespective of pressure conditions within the casing 10.

In place of the bellows type control shown in Figs. 1 and 3, the pressure-responsive element may be of the diaphragm type such as shown in Fig. 4. This type of control head 4ª comprises an inverted cup-like element 36 formed with a threaded boss 37 which projects from the underside through an opening in the cover 2 and formed with an axial opening through which a vent pipe 38 projects. The open end of the cup 36 carries a flexible diaphragm 40 to which the lower end of the vent 38 is suitably attached, the construction and arrangement of parts being such that the vent 38 rises and falls in response to pressure conditions within the vessel 1 when the vent pipe is closed.

A casing 42 surrounds the vent pipe 38 and its lower end is threaded about the projecting end of the boss 37 so as firmly to secure the cup 36 in position. The upper end of the vent 38 is shouldered, as indicated at 44, and receives a collar 45 which carries radially projecting arms 46 to which an annular plate 48 is attached, as shown more clearly in Fig. 6. A cap 50, formed with diametrically opposite slots to receive the arms 46, surrounds the upper end of the casing 42 and the upper end of this cap is formed with radial openings 52 which communicate with the interior of the cap. A valve stem 54 depends upon the upper end of the cap and its lower end is conical shaped so as to be engageable with the beveled end 55 of the vent pipe and provide a vent valve for the pipe 38. The construction and arrangement of parts is such that when pressure builds up within the vessel 1 it acts on the diaphragm 40 to raise the vent 38, thereby closing the vent valve 54 and simultaneously elevating the collar 45 and associated parts a distance corresponding to the pressure prevailing within the vessel 1, as in the control head shown in Fig. 3.

It will be noted that in each type of control head the parts may be so adjusted that when atmospheric temperature and pressure conditions prevail in the vessel 1, the vent valve is but slightly open, thus affording an opportunity for the escape of air when water or other liquid in the vessel is being heated; and when pressure starts to build up within the pressure vessel the pressure-responsive element (either the bellows 21 or diaphragm 40) gradually closes the vent valve so that by the time a predetermined pressure is reached the vent valve is completely closed. Continued increase in pressure operates the pressure-responsive element so as to elevate the collar carried by the vent pipe an amount corresponding to the increase in pressure, and in event pressure should build up beyond a predetermined maximum, such pressure would raise the valve stem thereby permitting excess pressure to blow off and providing, in effect, a weighted safety valve.

The upper end of the housing 8 (Figs. 1, 2 and 4) is provided with an opening 60 through which projects the upwardly curved extension or tail 61 of a control arm 62 pivoted at 64 to the front wall of the housing 8. The arm 62, as shown more clearly in Fig. 5, is of inverted U-shape cross section and its outer end is formed with an elongate slot 65 through which projects the upper end portion of the cap of the control head so that its radial arms are disposed above the upper surface of arm 62 and the movable arms associated with the pressure-responsive element are engageable with the lower edges of the arm 62. The construction and arrangement of parts are such that when the arm 62 is disposed in substantially horizontal or operating position (Figs. 4 and 5) the lower edges of its outer end are engageable with the radial arms of the pressure-responsive element, that is, in a position to respond to vertical movements of the vent pipe after a predetermined or normal operating pressure has been built up within the pressure vessel 1; and the fixed arms 35 are normally spaced above the upper face of the arm 62 so that when the arm 62 is swung upwardly in response to depression of its tail or extension 61, the cap is lifted upwardly so as to open the vent valve 32 or 54, as the case may be, as illustrated in Fig. 1.

The extension 61 is secured to a plate 66 spaced from the side walls of the housing 8 and this plate is provided with spaced openings which are in vertical alignment with similar openings formed in brackets 67 and 68 secured to the side walls of the housing, as shown in Figs. 1 and 2. A pair of control rods 70 and 71 are slidably mounted in the opening in brackets 67 and 68 and their upper ends project through the openings in the plate 66 and carry collars 72 and 73. The collars are yieldingly held in engagement with plate 66 by a tension spring 74 acting on control rod 70 and a compression spring 75 acting on control rod 71, the spring 75 being sufficiently powerful to swing the arm 62 upwardly from the position shown in Fig. 4 to that shown in Fig. 1. Hence, vertical movements of the arm 62 and plate 66 in response to movements of the diaphragm or bellows of the control head transmit a corresponding vertical movement to control rod 70 when the control rod 71 is held locked against downward vertical movement.

The lower part of the housing 8 encloses the timing mechanism comprising a spring clock 80 having its arbor 81 suitably connected with a spindle 82 which extends forwardly beneath the top of the stove 5 and projects outwardly beyond its front, as shown in Fig. 1. A hand wheel 84 and timing dial 85 (associated with a suitable index not shown) are secured to the spindle 82 so that by turning the hand wheel 84 the clock may be set to run for a period indicated by the dial 85 and associated index. The rear of the arbor 81 carries a wheel 88 formed with a notch 89 which receives a pin 90 carried by an arm 91 when the dial is in zero position. The arm 91 is pivoted at 92 to the frame of the clock and a tension spring 94 yieldingly urges the arm 91 downwardly so that the pin 90 is yieldingly held in the notch 89. When the hand wheel 84 is rotated to set the timing mechanism, the wheel 88 is also rotated so as to throw the pin 90 out of notch 89, thus causing the pin to ride on the periphery of the wheel 88 and hold the arm 91 in horizontal or operating position. The timing mechanism is also provided with a releasable lock comprising a pawl 95 pivoted at 96 to the upper part of the clock frame so that its locking tooth 98 is engageable with a gear 99 of the clock movement, as shown more clearly in Fig. 5. The upper end of the pawl is provided with a laterally extending tail 100 disposed beneath the end of the control rod 70, the construction and arrangement of parts being such that gravity (or a small spring if desired) holds the pawl in locking engagement with gear 99, but when the tail 100 is depressed, the pawl swings outwardly thereby unlocking the clock movement.

An L-shaped latch member 102 is pivotally mounted at 103 on the rear of the clock frame with its horizontal arm 104 connected by a spring coupling 105 to the free end of arm 91 and its vertical arm 106 projecting upwardly in position to engage the lower end of control rod 71 so as to support it in operating position, i. e., in position to permit the arm 62 to be swung to operating position (Fig. 4) when the timing mechanism has been set, as above described. When the pin 90 drops back into the notch 89 at the expiration of the period for which the timing mechanism was set, the arm 91 drops downwardly causing the latch 102 to swing clockwise (Figs. 2 and 5), thereby disengaging its arm 106 from the end of the control rod 71 to permit the latter to drop downwardly under the influence of spring 75. It will be observed that downward movement of the control 71 carries the plate 66 downwardly and thereby not only swings arm 62 upwardly to operate the vent valve in the manner previously explained, but also permits the control rod 70 to move downwardly under the influence of spring 74 to operate the locking pawl 95 and a control switch 110 connected in the circuit 111 of the heater 6 in the manner presently to be described.

The control switch 110 is of the self-closing type, such for example as a conventional electric switch sold under the trade name of Micro Switch or Mu Switch, which embodies quick or snap-acting spring members supporting the contacts in normally closed position and an operating pin or plunger 112 (Fig. 5) arranged to open the contacts when depressed a very slight amount. The switch 110 is disposed within the housing 8 with its operating pin 112 below but in closely spaced relation to the under side of the tail 100 of pawl 95, the construction and arrangement of parts being such that when an increase in pressure within the vessel 1 from atmospheric conditions to the predetermined starting pressure takes place, the pressure responsive element operates arm 62 to permit control rod 70 to undergo an initial downward movement sufficient to engage the tail 100 and swing pawl 95 outwardly from locking position to start the timing mechanism, and when the pressure within the vessel 1 rises above the predetermined normal, the pressure-responsive element swings arm 62 upwardly, a further amount, thereby permitting control rod 70 to drop downwardly a distance sufficient to depress the operating pin 112 and thereby shut off the current to the heater 6. So long as pressure conditions within the vessel 1 are above the predetermined normal the control rod 70 is in its lowermost operating position, holding the circuit 111 open, but when normal pressure conditions are restored the arm 62 swings downwardly and control rod 70 is carried upwardly sufficiently to disengage the operating pin 112 and thus permit the switch 110 to close the circuit. When the arm 62 is swung upwardly (Fig. 1) at the expiration of the cooking period, the spring 74 acts to hold the control rod 70 in its lowermost position with the pawl 95 in unlocked position and the operating pin 112 depressed to hold the circuit 111 open.

The power circuit 111 may be provided with a manually operated heat control switch 115 by means of which the power supply may be shut off and the current varied to control the degree of heating as in conventional electric stoves.

Both audible and visual signals may be provided to indicate the completion of the cooking or processing operation, and as here shown the audible signal comprises a bell 120 mounted on the inside of the front wall of housing 8, a striker 121 pivotally mounted on the end of an upstanding bracket 122 so that its tail is normally positioned directly in the path of movement of a collar 124 carried by control rod 71, the construction and arrangement of parts being such that when the latch 102 disengages from the control rod 71, the latter in dropping downwardly swings striker 121 upwardly to ring the bell 120.

The visual signal comprises a flag 125 (Fig. 4) pivotally mounted at 126 to the top of the housing so that when in upright position it is sufficiently top-heavy or off balance to drop downwardly. The lower end of the flag is secured to a curved shoe or supporting lug 128 engageable with the upper end of the control 70 when the parts are in operating position to hold the flag 125 upright, but disengageable with the end of the control rod 70 to permit the flag to drop downwardly when the control rod 70 drops to its lowermost position at the expiration of the cooking period.

A summary of the operation of the apparatus of Figs. 1 to 5 inclusive is as follows:

Assuming that the vessel 1 with its contents including sufficient water to generate an adequate amount of steam is properly positioned on the stove 6, that the cover 2, control head 10 and associated cap are in operating position, that the switch 115 is closed and that the control mechanism and associated parts are in the position shown in Fig. 1, the hand wheel 84 is first rotated to set the timing mechanism for the desired cooking period, thereby positioning latch 102 to engage the control rod 71, and the arm 62 is then swung downwardly to operating position, thereby simultaneously elevating control rod 71 whereupon the latch 102 swings into position to hold it in elevated position. The flag 125 may now be swung upwardly and held in upright position by shoe 128. Swinging the arm 62 downwardly also elevates rod 70, disengaging the end of the control rod 70 from tail 100 and operating pin 112, thereby permitting the pawl 95 to lock the timing mechanism and allow switch 110 to close the power circuit 111. The parts are now in operating position with the current turned on, but the timing mechanism is locked. As the water in the pressure vessel 1 comes to its boiling point air is expelled through the slightly open vent valve and pressure within the vessel is then gradually built up. The generation of steam within the vessel builds up sufficient pressure to actuate the pressure-responsive element and consequently the vent pipe 12 is elevated so as to close the vent valve and gradually swing arm 62 upwardly. When a predetermined starting pressure is reached the arm 62 has been raised sufficiently to permit control rod 70 to drop downwardly to release the locking pawl 95, whereupon the timing mechanism starts to operate. If the pressure within the vessel 1 builds up above the normal operating pressure the control rod responds by operating switch 110 to shut off the current until normal pressure conditions are restored in the manner above described. At the expiration of the period for which the timing mechanism is set, the wheel 88 having returned to its original position, the arm 91 drops downwardly causing the latch 102 to disengage the control rod 71, whereupon spring 75 operates to push the control rod 71 downwardly, thereby ringing the bell 120 and at the same time the arm 62 swings upwardly lifting cap 28 sufficiently to operate the vent valve. Simultaneously the spring 74 acts to pull control rod 70 downwardly, thereby tripping the flag 125 and operating switch 110 to shut off the current, thus restoring the parts to the position indicated in Fig. 1.

If for any reason it is desired to arrest the cooking or processing operation before the end of the period for which the timing mechanism is set the hand wheel 84 may be rotated back to zero position, thereby causing the latch 102 to disengage from control rod 71 and effecting the sequence of operations above described.

The embodiment shown in Figs. 6 to 8, except as hereinafter pointed out, is substantially the same in all material particulars as that shown in Figs. 1 to 5 and the same or similar reference characters are applied to corresponding parts. In this embodiment the pressure vessel 1 is provided with a pressure sealing valve 130 to allow the escape of air before the desired cooking pressure is reached.

The arm 62a is pivoted closer to its center of gravity, as shown at 64a, to a bracket 132 secured to the front face of the housing 8 and the tail of the arm is formed in two sections, the lower section 134 being rigid and the overhanging upper section 135 being relatively resilient. These sections are formed with openings aligned with those in the brackets 67 and 68 so as to support the control rods 70a and 71a for vertical movement as in the previously described embodiment. The upper end of the control rod 70a carries the collar 136 engageable with the underside of the lower section 134, and adjacent to its lower end the control rod 70a carries a collar 137 against which compression spring 138 acts yieldingly to urge the control rod upwardly so as normally to maintain the collar 136 in engagement with the section 134. The lower end of control rod 70a is so positioned with respect to the tail 100 of locking pawl 95 and the plunger 112 of the switch 110 as to operate in the same manner as above described in connection with the embodiment of Figs. 1 to 5.

The upper end of the control rod 71a is provided with a pair of collars 73 and 73a disposed on opposite sides of the section 135 and the lower end of the control rod 71a is provided with an offset extension 140. The control rod is yieldingly urged downwardly by compression spring 75. However, due to the resiliency of the section 135 slight movements of arm 62a in response to variations in pressure within the vessel 1 are not transmitted to rod 71a and hence the latter control rod is not sensitive or responsive to variations in pressure within the vessel 1.

The movement of clock 80a of the timing mechanism is connected by a small idler gear 142 to a larger gear 144 fastened to the spindle 82, the front end of which carries the hand wheel 84 and dial 85. The rear of the spindle 82 carries the notched timing wheel 88 and the horizontal arm 91a is pivotally mounted at one end to a block 145 secured to the lower end of the housing 8. The pin 90, carried by arm 91a, cooperates with the notched wheel 88 as in the previously described embodiment and the free end of the arm 91a extends laterally so as to engage the lower end of the extension 140. With this construction and arrangement the timing wheel 88 operates as in the previously described embodiment, but the arm 91a is directly associated with the control rod 71a, thereby simplifying the hand-setting operation and minimizing the work of the clock spring in operating the parts.

The operation of this modified form of apparatus is substantially identical to that above described, except that the air within the vessel 1 is vented mainly by the pressure plug 130, rather than through the vent pipe 12, during the period when the water in the vessel 1 is being brought to the boiling point after which the pressure plug automatically becomes sealed by condensed moisture so that the required operating pressure may build up within the vessel.

A particular advantageous feature of this construction resides in the design of the arm 62ª which is pivotally mounted adjacent to its center of gravity and hence is more sensitive to slight movements of the pressure-responsive element. Furthermore, the provision of the resilient or floating section 135 not only permits movements of the arm 62ª to be transmitted to the control rod 70ª without material interference by control rod 71ª, but also permits greater ease in making all adjustments.

Figure 11:
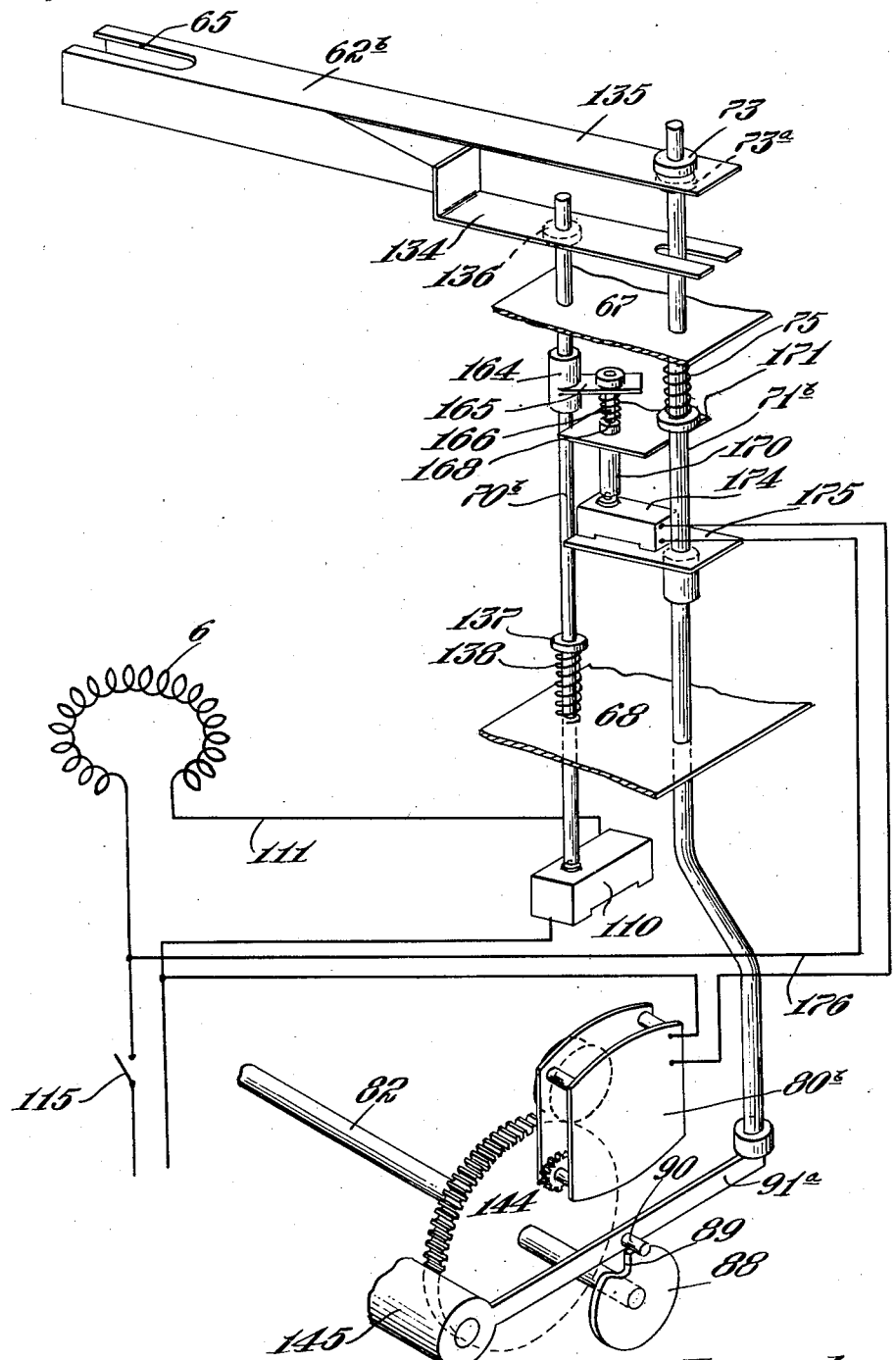
Fig. 11 is a diagrammatic view of the main operating mechanism of the apparatus shown in Figs. 9 and 10.

The embodiment shown in Figs. 9 to 11 is, in principle, similar to the previously described embodiments, and the same or similar reference characters are applied to corresponding parts. In this embodiment the cover 2 of the pressure vessel 1 is provided with a control head 4ᵇ, comprising a cylindrical upstanding neck 150 having a central bore 151 communicating with the interior of the vessel, the upper end of the bore defining a valve seat engageable by the lower end of a valve stem 152 of a cap 154. The upper end of the cap 154 is provided with a pair of diametrically disposed arms 35 engageable with the upper face of the free end of control arm 62ᵇ so as to be lifted thereby when the cap is positioned so that the arms 35 engage the marginal portions about slot 65. However, if it be desired not to vent the pressure vessel 1 after completion of the cooking operation, it is merely necessary to rotate the cap 154 so that its arms 35 clear the ends of arm 62ᵇ.

A sleeve 155 is circumposed about and in spaced relation to the lower end of the cap 154 and the upper part of the casing 150, and the upper end of the sleeve 155 is provided with four radially extending fingers 156, two of which are always in position to engage the lower edge of the free end of arm 62ᵇ when the sleeve is moved upwardly. The central portion of the sleeve is formed with one or more vent openings 158 (Fig. 10) and its lower end is riveted or otherwise rigidly secured to one end of a bimetallic strip or temperature-responsive element 160, the opposite end of which is anchored to a small metal block 162 rigidly secured to the cover 2 by rivets or other suitable means to insure a good thermal contact. The bimetallic element 160 at all times supports the sleeve 155 so that it is substantially out of contact with the casing 150 and cap 154, as illustrated in Fig. 10. When the temperature within the vessel 1 is at room temperature, or greatly below the normal operating temperature, the fingers 156 are spaced below the lower edge of the arm 62ᵇ; but when the temperature within the vessel 1 increases above a certain point, the bimetallic element responds and raises the sleeve 155 so as to cause the fingers 156 to engage arm 62ᵇ, and upon further increase in temperature within the vessel 1 the bimetallic element then operates through sleeve 155 and fingers 156 to swing the arm 62ᵇ upwardly, thus functioning in a manner corresponding to the bellows and diaphragm of the previously described embodiments.

The arm 62ᵇ is pivotally supported at 64ᵇ on the bracket 132 secured to the front face of the housing 8, as shown in Fig. 9, and the tail of the arm 62ᵇ is formed with two sections 134 and 135 which are operatively connected with control rods 70ᵇ and 71ᵇ slidably mounted in brackets 67 and 68, as in the embodiment of Figs. 6 to 8. The lower end of control rod 70ᵇ in Fig. 11 is directly engageable with the normally closed switch 110 for controlling the heater 6 in circuit 111 and at all times is yieldingly urged upward by the spring 138 acting on collar 137. Between the collars 136 and 137 the control rod 70ᵇ carries the sleeve 164 which is provided with a radially projecting arm 165 having a slidable dependable finger 166 about which is circumposed a spring 168, the upper end of which acts against the under surface of arm 165. A plunger 170 is slidably mounted to a bracket 171 secured to a housing 8 and the upper end of the plunger is secured to or integral with the finger 166 so as to form an annular shoulder against which the lower end of the spring 168 is seated.

The lower end of the plunger 170 is engageable with the operating button or finger of a normally open switch 174 supported on a bracket 175 secured to control rod 71ᵇ. The switch 174 is connected in a circuit 176 which includes an electric clock 80ᵇ associated with the timing mechanism (parts 82, 88—91ª, etc.) in the same manner as the spring-wound clock 80ª of the embodiment shown in Figs. 6 to 8. The circuit 176 may be connected to the main power circuit controlled by end switch 115 as indicated in Fig. 11.

The construction and arrangement of parts are such that when the arm 62ᵇ is swung to starting position by the setting of the timing mechanism, the control rod 71ᵇ is elevated sufficiently to raise the switch 174 to operating level, relative to the plunger 170, and the control rod 70ᵇ is held elevated sufficiently to hold its lower end and plunger 170 disengaged from the operating buttons of switches 110 and 174, respectively, that is, the switch 110 remains closed and the switch 174 remains open; but when the arm 62ᵇ swings upwardly to normal operating position in response to predetermined starting temperature conditions within the pressure vessel 1, the control rod 70ᵇ is forced downwardly sufficient to cause the plunger 170 to operate switch 174 to start the clock 80ᵇ. A further downward movement of the control rod 70ᵇ, due to an increase in temperature in the vessel 1 above the operating normal, is effective to operate switch 110 to shut off the current to heater 6, but such movement does not effect switch 174 since it is to be observed that the connection between the parts 164 and 170 is such that, due to spring 168, the rod 70ᵇ may be moved downwardly below the level at which the plunger 170 first contacts the operating button of switch 174. Upon restoration of normal operating temperature conditions within the vessel 1, the arm 62 swings downwardly and control rod 70ᵇ moves upwardly under the influence of spring 138 a distance sufficient merely to disengage its lower end from the switch 110, thereby closing the circuit 111, without effecting the operation of switch 174 which remains closed as long as the temperature within the vessel 1 is above a predetermined minimum. However, if the temperature conditions within the vessel should drop below the minimum, the arm 62ᵇ would swing downwardly, permitting control rod 70ᵇ to be pushed upwardly by spring 138 to disengage the plunger 170 from the switch 174, thereby opening circuit 176 to stop the time clock 80ᵇ, and likewise when the pin 90 drops into recess 89 at the end of the cooking or process period, the control rod 71ᵇ is pushed downwardly by spring 75 carrying the switch 174 to a point below the operating level.

A summary of the operations of the apparatus of Figs. 9 to 11 inclusive is as follows: assuming that the pressure vessel 1 with its contents is properly positioned on the stove 6, that the cover 2, control head 4b and the associated parts are in operating position, that the switch 115 is closed and that the control mechanism and associated parts are in the position shown in Fig. 9, the hand wheel connected by shaft 82 with the timing mechanism is rotated to set the mechanism for the desired cooking period, thereby swinging the lever 91a upwardly and elevating control rod 71b to bring switch 174 to operating level. With the arm 62b in starting position the control rod 70b is held elevated by spring 138 to operating level as above described. As the temperature within the vessel 1 builds up, the bimetallic element 160 responds in the manner previously explained, and when the predetermined starting temperature is reached, the bimetallic element 160, acting through sleeve 155 and arm 62b, depresses control rod 70b which acts through spring 168 and plunger 170 to close switch 174, whereupon the time clock is brought into operation. In event the temperature within the vessel should rise above the normal operating range the bimetallic element 160 automatically operates rod 70b to open switch 110, thereby shutting off the current supply to the heater 6; whereas an abnormal drop of temperature within the vessel below the normal starting condition likewise automatically causes the bimetallic element 160 to operate rod 70b to actuate switch 174 to stop the timing, as above explained. At the expiration of the period for which the timing mechanism is set, the wheel 88 having returned to its original position, the arm 91a drops downwardly, locking clock 80b and permitting spring 75 to push control rod 71b downwardly, thereby disengaging the switch 174 from its operating plunger 170 and at the same time swinging arm 62a upwardly and lifting the cap 154 sufficiently to vent the pressure vessel 1 if the arms 35 have been set as previously explained. Simultaneously the tail 134 of arm 62b acts to push control rod 70b downwardly so that its end operates switch 110 to shut off the current, thus restoring the parts to inoperative position. If for any reason it is desired to arrest the cooking operating before the end of the period for which the timing mechanism is set, the hand wheel may be rotated back to zero position, thereby causing the arm 91a to drop downwardly to inoperative position as in the previously described embodiments.

It is apparent from the foregoing that the pressure-operated control head of the previously described embodiments may be used in conjunction with the electrically-operated timing mechanism and associated parts shown in Fig. 11, and conversely, the bimetal or temperature-operated head shown in Figs. 9 and 10 may be used in conjunction with the mechanism shown in Fig. 8, without substantially changing the operation of the apparatus as above described.

A particularly advantageous feature of the design of the embodiments above described is that the control rod (70, 70a, 70b) and associated parts may be so adjusted that the pressure and/or temperature at which the timing starts may be somewhat below the full operating normal which the controls are regulated to maintain, thereby taking proper account of partial cooking which takes place during the heating-up period. Accordingly, the timing may be started at a pressure and/or temperature between one-half and three-quarters of the operating normal, since this makes the correct timing largely independent of the amount of material in the vessel and the intensity of heating.

Moreover, by simply adjusting the position of the collars on the control rod 70, 70a or 70b, the normal operating temperature and pressure of the apparatus may be varied from the minimum of 100° C. at normal atmospheric pressure, (or a lesser temperature with the embodiment of Figs. 9 to 11) to the maximum pressure and corresponding temperature which the vessel is designed to withstand.

While I have shown and described different desirable embodiments of the invention it is to be understood that this disclosure is for the purpose of illustration and that various changes and modifications may be made, as well as the substitution of equivalent elements for those herein shown and described, without departing from the spirit and scope of the invention as set forth in the appended claims.

I claim:

1. Pressure food cooking apparatus comprising an enclosed vessel having an opening, a control head associated with said opening and including a heat-responsive member, heating means arranged to apply heat to said vessel, timing mechanism including time setting means for governing the operation of said heating means, and control mechanism associated with said heat-responsive member so that when thermal conditions within said vessel rise above a predetermined point, said control mechanism operates to diminish said heating means.

2. Pressure food cooking apparatus comprising an enclosed vessel having an opening, a control head associated with said opening and including a pressure-responsive member, heating means arranged to apply heat to said vessel, heat control means, timing mechanism including time setting means for controlling the duration of operation of said heating means, and control mechanism associated with said pressure-responsive member, heat control means and timing mechanism and operative to start said timing mechanism and control said heating means in accordance with the action of said pressure-responsive member in responding to pressure conditions within said vessel, thereby to maintain the pressure within the vessel substantially constant during the predetermined cooking period.

3. Pressure food cooking apparatus comprising an enclosed vessel having an opening, a control head associated with said opening and including a pressure-responsive member, heating means arranged to apply heat to said vessel, heat control means for controlling said heating means, timing mechanism including time setting means for governing the operation of said heat control means, and control mechanism associated with said pressure-responsive member, said heat control means and said timing mechanism and operative when pressure conditions within said vessel fall below a predetermined point to increase the heat applied to said vessel.

4. Pressure food cooking apparatus comprising an enclosed vessel having an opening, a control head associated with said opening and including a temperature-responsive member, heating means arranged to apply heat to said vessel, heat control means for controlling said heating means, timing mechanism including time setting means for governing the operation of said heat control means, and control mechanism associated with said temperature-responsive member, heat control means and timing mechanism and operative when temperature conditions within said vessel rise above a predetermined point to diminish heat applied to said vessel.

5. Pressure food cooking apparatus comprising an enclosed vessel having an opening, a control head associated with said opening and including a heat-responsive member, heating means arranged to apply heat to said vessel, heat control means for controlling said heating means, timing mechanism including a clock, time-setting means and clock control means governing the operation of said clock, and control mechanism associated with said heat-responsive member, the clock control means and heat controls, and operative when thermal conditions within said vessel are below a predetermined normal to permit heat to be applied to said vessel and when pressure conditions rise to said predetermined normal to operate said clock control means so as to start said timing mechanism and when said pressure conditions arise above said predetermined normal to operate said heat control means to diminish the heat applied to said vessel.

6. Pressure food cooking apparatus comprising an enclosed vessel having an opening, a control head associated with said opening and including a heat-responsive member, heating means arranged to apply heat to said vessel, heat control means for controlling said heating means, timing mechanism including a clock, time-setting means and clock control means governing the operation of said clock, and control mechanism including a control member actuated by said heat-responsive member and connected with the heat control means and clock control means so that when thermal conditions within said vessel are below a predetermined normal said control member is operative to permit heat to be applied to said vessel and when thermal conditions rise to predetermined normal to operate said clock control means so as to start said timing mechanism and when thermal conditions rise above said predetermined normal to operate said heat control means to diminish heat applied to said vessel, said control mechanism including a second member associated with said timing mechanism and conjointly operative with the first control member to operate said heat control means to shut off heat applied to said vessel upon the expiration of the period for which said timing mechanism is set.

7. Pressure food cooking apparatus comprising an enclosed vessel having an opening, a control head associated with said opening and including a vent valve and a heat-responsive member, heating means arranged to apply heat to said vessel, heat control means for controlling said heating means, timing mechanism including a clock, time-setting means and clock control means governing the operation of said clock, and control mechanism including a control member associated with said heat-responsive member, the clock control means and heat controls, and operative when thermal conditions within said vessel are below a predetermined normal to permit heat to be applied to said vessel and when thermal conditions rise to said predetermined normal to operate said clock control means so as to start said timing mechanism and when said thermal conditions arise above said predetermined normal to operate said heat control means to diminish the heat applied to said vessel, said control mechanism also including a second member associated with said control member, vent valve and timing mechanism and operative upon the expiration of the period for which said timing mechanism is set for operating said heat control means to shut off the heat applied to said vessel and simultaneously operate said valve to release the pressure within said vessel.

8. Pressure food cooking apparatus comprising an enclosed vessel having an opening, a control head associated with said opening and including a vent valve and a heat-responsive member, heating means arranged to apply heat to said vessel, heat control means for controlling said heating means, timing mechanism including a clock, time-setting means and clock control means governing the operation of said clock, and control mechanism including a control member associated with said heat-responsive mechanism, the heat control means and clock control means so that when thermal conditions within said vessel are below a predetermined normal said control member is operative to permit heat to be applied to said vessel and when thermal conditions rise to predetermined normal to operate said clock control means so as to start said timing mechanism, and when thermal conditions rise above said predetermined normal to operate said heat control means diminish down heat applied to said vessel, said control mechanism including a second member associated with said timing mechanism and vent valve, the control members being conjointly operative upon the expiration of the period for which said timing mechanism is set to shut off heat applied to said vessel and operate said valve so as to vent said vessel.

9. Pressure food cooking apparatus comprising an enclosed vessel having an opening, a control head asociated with said opening and including a pressure-responsive member, heating means arranged to apply heat to said vessel, heat control means for controlling said heating means, timing mechanism including time-setting means and a releasable locking member for holding the timing mechanism locked, and control mechanism associated with said pressure-responsive member, the locking member and heat controls and operative when pressure conditions within said vessel are below a predetermined normal to permit heat to be applied to said vessel and when pressure conditions rise to said predetermined normal to operate said locking member so as to start said timing mechanism and when said pressure conditions arise above said predetermined normal to operate said heat control means to diminish the heat applied to said vessel.

10. Pressure food cooking apparatus comprising an enclosed vessel having an opening, a control head asociated with said opening and including a pressure-responsive member, heating means arranged to apply heat to said vessel, heat control means for controlling said heating means, timing mechanism including time-setting means and a releasable locking member for holding the timing mechanism locked, and control mechanism including a control member actuated by said pressure-responsive member and connected with the heat control means and locking member so that when pressure conditions within said vessel are below a predetermined normal said control member is operative to permit heat to be applied to said vessel and when pressure conditions rise to predetermined normal to release said locking member so as to start said timing mechanism and when pressure conditions rise above said predetermined normal to operate said heat control means to shut down heat applied to said vessel, said control mechanism including a second member associated with said timing mechanism and conjointly operative with the first control member to operate said heat control means to diminish heat applied to said vessel upon the expiration of the period for which said timing mechanism is set.

11. Pressure food cooking apparatus comprising an enclosed vessel having an opening, a control head associated with said opening and including a vent valve and a pressure-responsive member, heating means arranged to apply heat to said vessel, heat control means for controlling said heating means, timing mechanism including time-setting means and a releasable locking member for holding the timing mechanism locked, and control mechanism including a control member associated with said pressure-responsive member, the locking member and heat controls and operative when pressure conditions within said vessel are below a predetermined normal to permit heat to be applied to said vessel and when pressure conditions rise to said predetermined normal to operate said locking member so as to start said timing mechanism and when said pressure conditions arise above said predetermined normal to operate said heat control means to shut down the heat applied to said vessel, said control mechanism also including a second member associated with said control member, vent valve and timing mechanism and operative upon the expiration of the period for which said timing mechanism is set for operating said heat control means to diminish the heat applied to said vessel and simultaneously operate said valve to release the pressure within said vessel.

12. Pressure food cooking apparatus comprising an enclosed vessel having an opening, a control head associated with said opening and including a vent valve and a pressure-responsive member, heating means arranged to apply heat to said vessel, heat control means for controlling said heating means, timing mechanism including time-setting means and a releasable locking member for holding the timing mechanism locked, and control mechanism including a control member associated with said pressure-responsive mechanism, the heat control means and locking member so that when pressure conditions within said vessel are below a predetermined normal said control member is operative to permit heat to be applied to said vessel and when pressure conditions rise to predetermined normal to release said locking member so as to start said timing mechanism and when pressure conditions rise above said predetermined normal to operate said heat control means to shut down heat applied to said vessel, said control mechanism including a second member associated with said timing mechanism and vent valve, the control members being conjointly operative upon the expiration of the period for which said timing mechanism is set to diminish heat applied to said vessel and operate said valve so as to vent said vessel.

13. Pressure food cooking apparatus comprising an enclosed vessel having an opening, a control head associated with said opening, said head having a vent valve and a pressure-responsive element connected with a movable arm, heating means for applying heat to said vessel, heat control means for controlling said heating means, timing mechanism having a setting means and a releasable locking member for holding the timing mechanism locked, a pivoted arm engageable with said movable arm so that the pivoted arm is moved in response to the pressure-responsive member, and control mechanism connected with said pivoted arm, locking member and heat control means so that when pressure conditions within said vessel are below a predetermined normal then the control mechanism operates to permit heat to be applied to said vessel and when pressure conditions within said vessel rise to a predetermined normal said locking member is released so as to start said timing mechanism and when pressure conditions within said vessel rise above said predetermined normal the heat control means is operated to diminish the heat applied to said vessel.

14. Pressure food cooking apparatus comprising an enclosed vessel having an opening, a control head associated with said opening, said head having a relief valve and a pressure-responsive element connected with a movable arm, heating means for applying heat to said vessel, heat control means for controlling said heating means, timing mechanism having a setting means and a releasable locking member for holding the timing mechanism locked, a pivoted arm engageable with said movable arm so that the pivoted arm is moved in response to the pressure-responsive member, control mechanism connected with said pivoted arm, locking member and heat control means so that when pressure conditions within said vessel are below a predetermined normal then the control mechanism operates to permit heat to be applied to said vessel and when pressure conditions within said vessel rise to a predetermined normal said locking member is released so as to start said timing mechanism and when pressure conditions within said vessel rise above said predetermined normal the heat control means is operated to diminish the heat applied to said vessel, and means connected with said timing mechanism and operatively associated with said relief valve so that upon the expiration of the period for which said timing mechanism is set said means operates said valve to release pressure within said vessel.

15. Pressure food cooking apparatus comprising an enclosed vessel having an opening, a control head associated with said opening, said control head having a vent valve and valve arm by which the valve may be opened and a pressure-responsive member connected with a movable arm, heating means for applying heat to said vessel, heat-control means for controlling said heating means, timing mechanism having setting means and a releasable locking member for holding the timing mechanism locked, a pivoted arm having one part engageable with said movable arm so that said pivoted arm is moved in response to movements of said pressure-responsive member and another part engageable with said valve arm so as to operate said valve, and control mechanism associated with said pivoted arm, locking member and heat control means so that when pressure conditions within said vessel are below a predetermined normal the heat control means operates to apply heat to said vessel and when pressure conditions within said vessel rise to said predetermined normal said locking member is released to start said timing mechanism and when pressure conditions within said vessel rise above said predetermined normal said heat control means is operated to diminish heat applied to said vessel, said control mechanism including means associated with said timing mechanism and pivoted arm and operative upon the expiration of the period for which said timing mechanism is set to swing said pivoted arm so as to operate said valve, thereby venting said pressure vessel.

16. Pressure food cooking apparatus comprising an enclosed vessel having an opening, a control head associated with said opening, said control head having a vent valve and valve arm by which the valve may be opened and a pressure-responsive member connected with a movable arm, heating means for applying heat to said vessel, heat control means for controlling said heating means, timing mechanism having setting means and a releasable locking member for holding the timing mechanism locked, a pivoted arm having a part engageable with said movable arm so that said pivoted arm is moved in response to movements of said pressure-responsive member and another part engageable with said valve arm so as to operate said valve, and control mechanism comprising a member connected with said pivoted arm and having parts engageable with said locking member and heat control means so that when said pivoted arm is moved in response to pressure conditions below a predetermined normal the heat control means operates to apply heat to said vessel, and when pressure conditions within said vessel rise to said predetermined normal said pivoted arm is moved to effect release of said locking member so as to start said timing mechanism and when said pivoted arm is moved in response to pressure conditions above said predetermined normal said heat control means is operated to diminish heat applied to said vessel, said control mechanism having a second member connected with said pivoted arm and with said timing mechanism and operative upon the expiration of the period for which said timing mechanism is set to move said pivoted arm to operate said valve arm so as to vent said vessel.

17. Pressure food cooking apparatus comprising an enclosed vessel having an opening, a control head associated with said opening and having a pressure-responsive member connected with a movable arm, an electric heater for applying heat to said vessel, a switch controlling the flow of current to said heater, timing mechanism having setting means and a releasable locking member for holding the timing mechanism locked, and control means comprising a pivoted arm engageable with said movable arm so as to swing in response to movement of said movable arm, and a control member connected with said pivoted arm and operatively positioned with respect to said locking member and switch so as to release said locking member in response to movements of said pressure member caused by predetermined normal pressure conditions within said vessel and subsequently operative to open said switch when the pressure within said vessel rises above said predetermined normal, and means connected with said pivoted arm and timing mechanism operative upon the expiration of the period for which said timing mechanism is set to effect opening of said switch and locking of said timing mechanism.

18. Pressure food cooking apparatus comprising an enclosed vessel having an opening, a control head associated with said opening, said control head having a vent valve and valve arm by which the valve may be opened and a pressure-responsive member connected with a movable arm, an electric heater for applying heat to said vessel, a switch controlling the flow of current to said heater, timing mechanism having setting means and a releasable locking member for holding the timing mechanism locked, and control means comprising a pivoted arm having a part engageable with said movable arm so as to swing in response to movement of said movable arm and a part engageable with said valve arm so as to operate said valve, and a control member connected with said pivoted arm and operatively positioned with respect to said locking member and switch so as to release said locking member in response to movements of said pressure member caused by predetermined normal pressure conditions within said vessel and subsequently operative to open said switch when the pressure within said vessel rises above said predetermined normal, and means connected with said pivoted arm and timing mechanism operative upon the expiration of the period for which said timing mechanism is set to effect opening of said switch, locking of said timing mechanism and operation of said valve arm to vent said vessel.

19. Pressure food cooking apparatus comprising an enclosed cooking vessel, pressure-responsive means, heating means for applying heat to said vessel, a timing mechanism including time-setting means, said timing mechanism being connected with said heating means so as to control the duration of its operation, control mechanism connected with said pressure-responsive means and timing mechanism and effective upon the attainment of a predetermined pressure within said vessel to start the timing mechanism and control mechanism connected with said pressure responsive means and said heating means and effective during the predetermined cooking period to maintain the pressure within the vessel substantially constant by controlling the heating means in accordance with the action of said pressure responsive means.

20. Pressure food cooking apparatus comprising an enclosed vessel having an opening, a control head associated with said opening, said control head having a vent valve and valve arm by which the valve may be opened and a pressure-responsive member connected with a movable arm, an electric heater for applying heat to said vessel, a switch controlling the flow of current to said heater, timing mechanism having setting means and a releasable locking member for holding the timing mechanism locked, and control means comprising a pivoted arm engageable with said movable arm so as to swing in response to movement of said movable arm, said pivoted arm having a part engageable with said valve arm to operate said valve when swung upwardly, and a control member connected with said pivoted arm and operatively positioned with respect to said locking member and switch so as to release said locking member in response to movements of said movable arm caused by predetermined normal pressure conditions within said vessel and subsequently operative to open said switch when the pressure within said vessel rises above said predetermined normal, and means connected with said pivoted arm and timing mechanism operative upon the expiration of the period for which said timing mechanism is set to swing said pivoted arm upwardly so as to operate said valve to vent said vessel and simultaneously actuate said control member to effect opening of said switch and locking of said timing mechanism.

21. A cooking device comprising a fluid-tight vessel for food to be cooked under pressure, means for heating said vessel, a time-measuring device adapted to be set for a predetermined period of cooking at a predetermined pressure, means operable upon said device being set for a period of cooking to render said heating means effective to deliver heat to said vessel, means operable in response to the pressure in said vessel for delaying the time-measuring operation of said device until said vessel reaches substantially said predetermined pressure and then for initiating such time-measuring operation, means for controlling the heat delivery of said heating means in response to the pressure in said vessel to maintain the same substantially constant, and means controlled by said time-measuring device to terminate heat delivery from said heating means upon the end of said predetermined period of time.

22. A cooking device comprising a fluid-tight vessel for food to be cooked under pressure, means for heating said vessel, a time-measuring device adapted to be set for a predetermined period of cooking at a predetermined pressure, means controlled by said device to render said heating means effective to deliver heat to said vessel, means operable in response to the pressure in said vessel for delaying the time-measuring operation of said device until said vessel reaches substantially said predetermined pressure and then for initiating such time-measuring operation, means for controlling the heat delivery of said heating means in response to the pressure in said vessel to maintain the same substantially constant, and means controlled by said time-measuring device to terminate heat delivery from said heating means upon the end of said predetermined period of time.

23. A pressure food cooking device comprising a fluid-tight vessel, heating means for heating said vessel, means to energize said heating means including clock mechanism having means to set the same to measure a predetermined time interval, a brake adapted to engage and render said clock mechanism ineffective to measure said time interval, pressure-responsive means adapted to disengage said brake from said clock mechanism to render the latter effective to begin measuring said time interval when the pressure within said vessel first reaches a predetermined value, means also adapted to be actuated by said pressure-responsive means and controlling said heating means to maintain the pressure within said vessel subtantially at a predetermined value, and means operable by said clock mechanism to terminate energization of said heating means at the end of said time interval.

24. The structure recited in claim 23 together with a signal operable to indicate the end of the cooking operation.

25. The structure recited in claim 23 together with means for automatically discharging steam from said vessel at the end of the cooking operation.

26. A pressure food cooking device comprising a fluid-tight vessel, heating means for heating said vessel, means to energize said heating means including clock mechanism having means to set the same to measure a predetermined time interval, a brake adapted to engage and render said clock mechanism ineffective to measure said time interval, temperature-responsive means adapted to disengage said brake from said clock mechanism to render the latter effective to begin measuring said time interval, when the temperature within said vessel first reaches a predetermined value, means also adapted to be actuated by said temperature-responsive means and controlling said heating means to maintain the temperature within said vessel substantially at a predetermined value, and means operable by said clock mechanism to terminate energization of said heating means at the end of said time interval.

27. A pressure food cooking device comprising a fluid-tight vessel, heating means for heating said vessel, clock mechanism having means to set the same to measure a predetermined time interval, pressure-responsive mechanism movable in response to variations in pressure within said vessel and adapted to start said clock mechanism when the pressure within said vessel first reaches a predetermined value, mechanism operable by said clock mechanism to disconnect the heating means at the end of said time interval, pressure-responsive mechanism movable in response to variations in pressure within said vessel and a controller for said heating means adapted to be actuated by said pressure-responsive mechanism to control the heating means to maintain the pressure within said vessel substantially at a predetermined value during the predetermined cooking period.

28. The structure recited in claim 27 together with a valve for discharging air from said vessel for a period prior to the starting of said clock mechanism.

29. The structure recited in claim 27 together with a signal operable to indicate the end of the cooking operation.

30. The structure recited in claim 27 together with means for automatically discharging steam from said vessel at the end of the cooking operation.

31. A pressure food cooking device comprising a fluid-tight vessel, heating means for heating said vessel, clock mechanism having means to set the same to measure a predetermined time interval, temperature-responsive mechanism movable in response to variations in temperature within said vessel and adapted to start said clock mechanism when the temperature within said vessel first reaches a predetermined value, mechanism operable by said clock mechanism to disconnect the heating means at the end of said time interval, temperature-responsive mechanism movable in response to variations in temperature within said vessel and a controller for said heating means adapted to be actuated by said temperature-responsive mechanism to control the heating means to maintain the pressure within said vessel substantially at a predetermined value during the predetermined cooking period.

32. The structure recited in claim 31 together with a valve for discharging air from said vessel for a period prior to the starting of said clock mechanism.

33. The structure recited in claim 31 together with a signal operable to indicate the end of the cooking operation.

34. The structure recited in claim 31 together with means for automatically discharging steam from said vessel at the end of the cooking operation.

LYMAN F. WHITNEY.

(References on following page)

REFERENCES CITED

The following references are of record in the file of this patent:

UNITED STATES PATENTS

| Number | Name | Date |
|---|---|---|
| 771,013 | Herdrich | Sept. 27, 1904 |
| 1,437,005 | Newsom | Nov. 28, 1922 |
| 1,661,252 | Fricke et al. | Mar. 6, 1928 |
| 1,702,480 | Newsom | Feb. 19, 1929 |
| 1,931,190 | Goughnour | Oct. 17, 1933 |
| 2,304,802 | Crew | Dec. 15, 1942 |
| 2,308,603 | Graham | Jan. 19, 1943 |
| 2,319,114 | Cook | May 11, 1943 |
| 2,369,932 | Allen | Feb. 20, 1945 |
| 2,392,077 | Wilson | Jan. 1, 1946 |

Certificate of Correction

Patent No. 2,472,451 June 7, 1949

LYMAN F. WHITNEY

It is hereby certified that errors appear in the printed specification of the above numbered patent requiring correction as follows:

Column 3, line 34, for " t receive" read *to receive*; column 7, line 14, after the word "control" insert *rod*;

and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*